Sept. 18, 1951 R. A. HARTMAN 2,568,584
FASTENING DEVICE
Filed Dec. 9, 1947

Inventor
RICHARD A. HARTMAN
By H. G. Lombard
ATTORNEY

Patented Sept. 18, 1951

2,568,584

UNITED STATES PATENT OFFICE 2,568,584

FASTENING DEVICE

Richard A. Hartman, Cleveland, Ohio, assignor to Tinnerman Products, Inc., Cleveland, Ohio, a corporation of Ohio Application December 9, 1947, Serial No. 790,461

1 Claim. (Cl. 85—36)

This invention relates in general to spring fasteners and deals more particularly, with spring fasteners which are employed with a cooperating stud or shank member to secure the parts of an assembly in the manner of a spring nut, or the like.

In many fastening assemblies, the surface of a stud member is often hard and tough as, for example, in instances where a name plate is provided with a coating of chrome plating and such plating is also formed on the attaching studs of the name plate during the plating operation. In other instances a bolt or stud of required strength for a heavy duty installation must necessarily be made of high strength metal which likewise presents a relatively hard and tough surface.

In the use of spring nut devices and the like with studs and bolts having a hard surface or plating of this nature, it has been found that spring nuts heretofore available do not have sufficient biting qualities to dig into and become embedded in the relatively hard surface of the bolt or stud to the degree necessary to provide a positive and secure fastening assembly that is not subject to loosening or displacement as a result of vibration and jarring effects and the like.

A primary object of the invention, therefore, is to provide an improved spring fastener of this character comprising a sheet metal body having one or more tongues adjacent a bolt or stud opening therein, and with the extremity of the tongue provided with a special prong formation which is adapted in the applied fastening position of the fastener to dig into and become embedded in a relatively hard or tough surface on the bolt or stud with such grip and tenacity as to withstand extraordinary stress and strain and the most severe conditions of shock, vibration and jarring effects, and the like.

A further object of the invention is to provide such a spring nut fastener or the like in which the special prong formation on a tongue extremity comprises a sharp pointed edge defined by the point of the prong, and with the tongue and prong so formed that such pointed edge is adapted to engage the bolt or stud by a substantially vertical line contact in a manner to dig into and become materially embedded in the stud, regardless of a relatively hard and tough surface on the stud.

Another object of the invention is to provide a spring nut, or the like, such as described, in which the prong formation on a tongue extremity comprises a pair of such prongs defining spaced vertical knife edges which cooperate in providing a balanced, equal biting engagement with the bolt or stud at spaced points.

A further object of the invention is to provide a spring nut fastener or the like of the character described which may be designed with any selected number of bolt or stud engaging tongues, as aforesaid, depending on the size and nature of the stud and the strength required in a completed fastening assembly.

Further objects and advantages of the invention and other new and useful features in the construction, arrangement and general combination of elements will be readily apparent as the following description proceeds with reference to the accompanying drawings, for purposes of illustration but not of limitation, in which like reference characters designate like parts throughout, and in which:

Fig. 2 is a sectional view of a fastening assembly showing the improved spring nut as applied to positive fastening engagement with a stud having a relatively hard surface of chrome plating or the like;

Figure 5:
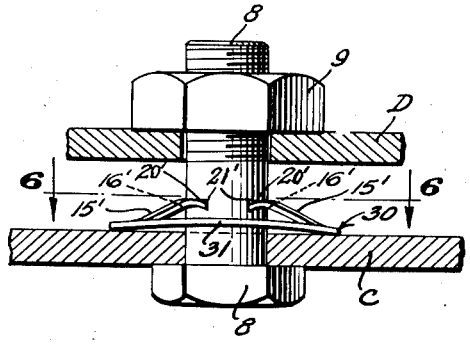
Figure 6:
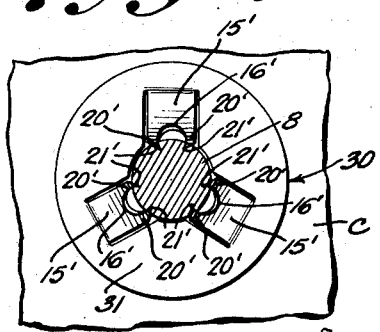

Fig. 5 is a sectional view of an assembly showing another form of spring nut or the like in accordance with the invention as employed, for example, as a retainer for holding in fastening position a high-strength bolt having a relatively hard and tough surface; and, Fig. 6 is a sectional view of Fig. 5, along line 6—6, looking in the direction of the arrows, showing the general design and formation of the spring fastener in this form of the invention.

The improved spring fastening means of the invention, may be provided as integral fastening elements in any sheet metal structural member, or may assume the form of a sheet metal fastening or locking plate usable substantially in the manner of a spring nut. In the latter respect, there is a much wider range and variety of uses and accordingly, it is to be understood that though the description which follows refers to the spring fastening means as spring nuts, it is fully contemplated that the essential features and characteristics thereof be embodied as the fastening means in any equivalent structure secured by a bolt or stud fastening device whether a separate shank member or integral connecting stud element or the like.

A spring fastener in accordance with the invention may be provided of any size or shape but is preferably formed from an inexpensive, substantially rectangular section of metal which may be obtained at minimum cost from ordinary sheet metal strip stock without loss or waste of material. Any suitable sheet metal may be employed but preferably that of a spring metal nature such as tempered spring steel or cold rolled steel having spring-like characteristics. By suitable slitting, bending and forming operations, the sheet metal section comprising the spring nut is provided with projecting bolt engaging means in the form of one or more tongues or the like having a special prong formation on the extremities thereof adapted for biting, gripping engagement with a bolt or stud in applied fastening position. It will be understood that the extremities of such tongues of the spring fastener are designed to yield in permitting the bolt or stud to be readily passed therebetween in one direction to applied fastening position in which relation the spring nut is effective to provide a rigid, tightened installation under continuously effective spring tension. In such applied fastening position of the bolt and spring nut, any ordinary axial force on the bolt or stud toward disengagement or removal from the spring nut not only is prevented but also results in a movement of the tongues toward each other in a direction to diminish the space therebetween and thereby cause the prongs on the extremities thereof to engage the stud even more positively and securely.

Figure 1:
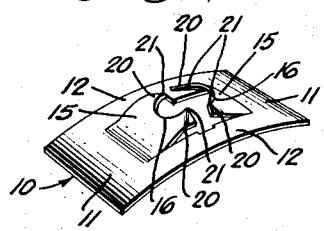
Fig. 1 is a perspective view showing the general construction of a spring nut or the like provided in accordance with the invention.
Figure 2:
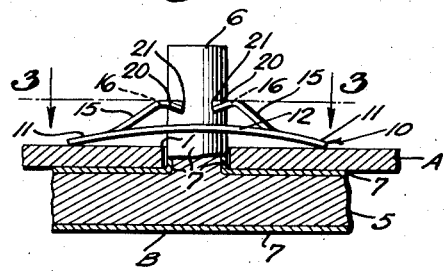
Figure 3:
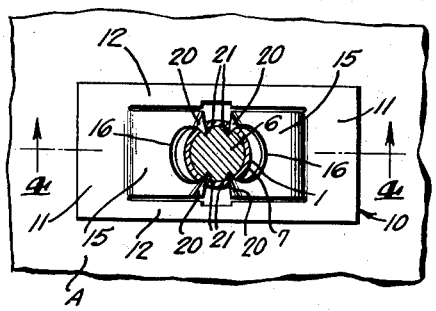
Fig. 3 is a sectional view of Fig. 2, along line 3—3, looking in the direction of the arrows, and showing in top plan the improved spring nut device and the anchoring engagement thereof with the bolt or stud, represented in section.
Figure 4:
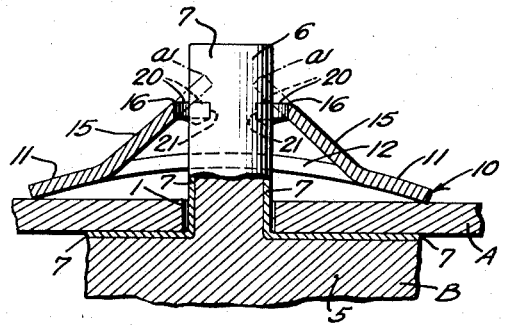
Fig. 4 is a sectional view of Fig. 3, along line 4—4, looking in the direction of the arrows, showing, on an enlarged scale, the anchoring engagement of the spring nut or the like in fastening engagement with the bolt or stud.

Referring now, more particularly, to the drawings, Fig. 1 shows a general type of spring nut construction in accordance with the invention which is designed for application to a bolt or stud or the like, as shown in Figs. 2, 3, and 4, to secure any two or more parts of an assembly. The typical fastening assembly shown comprises a support in the form of a panel A, or plate or the like, of any suitable sheet metal, wood or fibre board construction. The plate or panel A is formed with the required number of passages 1 for receiving the connecting or attaching studs on the part B along the path which such part extends in mounted position on part A. In the present illustration, the part B, Figs. 2 and 4, represents a fragment of a name plate, for example, comprising a base portion 5 having an integral connecting stud 6 at the rearward side thereof extending through the opening 1 in the support A. In many instances, such a name plate or the like is provided with a surface of chrome plating 7 or other lustrous finish and in ordinary plating operations it is not usually practical to avoid plating of the studs 6 also. This plating 7 is relatively hard and tough and the coating thereof on the studs 6 makes it necessary that the stud engaging elements of the spring nut or the like for securing such a stud be capable of piercing such plating and digging into and becoming embedded in the body of the stud in order to ensure a positive and reliable fastening assembly which is not subject to loosening or displacement as a result of vibration, jarring effects, and the like. To this end, the spring nut fastener of the invention is provided with a special prong formation on the extremities of the tongues or other stud engaging elements in a manner whereby any such prong is adapted to pierce or cut through the plating 7 on the stud and otherwise project through a cut or slit in such plating into embedded relation with the body of the stud. Similarly, in the case of a bolt or stud having a relatively hard surface, the prong or prongs on the extremity of the tongue are capable of penetrating such relatively hard surface and forcing the pointed edge thereof into positive anchored relation with the body of the bolt.

The spring fastener, designated generally 10, may be provided in any suitable design to comprise one or more tongues having a special prong formation on the extremity thereof adapted to effect the desired anchored and embedded engagement with a bolt or stud, as and for the purposes just described. The tongues of the spring fastener may be provided either as integral elements in any sheet metal structure or, in the manner of a spring nut device of the general character shown in Fig. 1. Such a spring nut preferably is constructed of a plate-like body of spring metal suitably stamped with a stud or bolt opening intermediate spaced parallel slits to define end portions 11 joined by side or bridge portion 12 between which a pair of cooperating tongues 15 extend upwardly out of the plane of the fastener body. The extremities or free ends of such tongues are each provided with an intermediate cutout 16 of arcuate shape, or, of any other suitable design forming pointed prongs 20 in opposed relation in the manner of spaced teeth defining a biting jaw therebetween. The end of any such prong, accordingly, is in the form of a pointed edge 21, Fig. 4.

It will be understood that such a prong element 20 and the pointed edge 21 on the extremity thereof lies initially in the plane of the associated tongue 15 as represented by the broken lines a in Fig. 4. Therefore, in order to adapt such pointed edge 21 for most effective anchoring engagement with the bolt or stud 5 by line contact therewith, the prong elements 20 are bent downwardly toward the fastener base, as shown in dotted lines in Fig. 4, to the extent necessary to dispose said pointed edges 21 of the prong extremities in more or less vertical relation and parallel to the axial outer surfaces of the bolt or stud 6. In this way, the pointed edges 21 of the prongs are so arranged and disposed as to approach and engage the bolt or stud 6 by generally vertical line contact. The pointed edges 21 define sharp knife edges which are adapted relatively easily to cut and pierce the plating 7 on the stud and embed in the body thereof, or, in the case of a bolt having a relatively hard surface, to penetrate such hard surface and anchor in the body of the bolt. The knife edges 21 defining the points of the prongs 20, accordingly, are adapted to engage the stud or bolt in a vertical, slitting or cutting action to penetrate the hard, tough plating 7 or other hard surface thereon so that in the tightened, tensioned fastening position of the fastener, such knife edges bite or dig into the body of the bolt or stud in anchored embedded engagement therewith.

The body or base of the spring nut or locking plate defined by the end and side portions 11, 12, respectively, is somewhat flexible and is so formed in the stamping operation as to have a pronounced, generally concave configuration in normal untensioned relation. Inasmuch as the body of the spring nut is flexible, the tongue elements 15 thereof are necessarily relatively yieldable with respect to each other and readily adapted for sliding engagement with the shank of the bolt or stud in one direction in the manner of a clutch, and accordingly, may be speedily applied to fastening position by substantially axial, thrust-like motion in a minimum of time and effort, and the generally concave body of the device flattened in such fastening position to secure the fastened parts of an installation under continually effective spring tension.

From the foregoing, it will be appreciated that when the spring nut 10 is applied to the projecting free end of the stud shank, Figs. 2 and 4, and pressure exerted on the fastener body in a substantially axial, thrust-like movement, the prongs 20 on the extremities of the yieldable tongues 15 are caused to slide along the bolt shank to a position in which the end portions 11 of the fastener body contact the adjacent surface of the supporting part A. The action is such that the vertical knife edges 21, Fig. 4, defined by the points of the prongs 20 slide along the stud by substantially vertical line contact and slit or cut the plating 7 or other hard surface of the stud in the manner of slight grooves extending vertically of the stud to the position in which the end portions 11 of the generally concave base of the fastener abut the adjacent surface of the structural part A, as aforesaid. At such point, upon continued pressure on the generally bowed side or bridge portions 12 of the spring nut, the prongs 20 are embedded in anchored relation with the body of the bolt or stud and said bowed side portions 12 are so compressed that the generally concave base of the spring nut is tensioned and assumes the form of a substantially flat section which, in attempting to resume its initial, normal, untensioned concave configuration, naturally tends to transmit a lifting force to the tongues to draw the shank of the stud axially, thereby taking up any clearance in the parts secured and firmly and rigidly securing the same under constant spring tension.

It will be understood that the flattening of the spring fastener body in this manner in the final applied fastening position thereof causes the knife edges 21 of the prongs 20 on the extremities of the tongues 15 to penetrate through the previously slit or cut plating 7 on the surfaces of the stud and become materially embedded in the body of the stud in anchored, positive locked engagement therewith as shown in Fig. 3. In the event that the stud is plated, this penetration extends through such plating 7 and materially into the body of the stud and likewise, in the case of a bolt having a relatively hard surface, such penetration extends through this hard surface to such degree that the knife edges 21 of the prongs are relatively deeply embedded in the body of the bolt. The arrangement is such that said knife edges 21 are so disposed as to engage the stud or bolt by substantial line contact and the adjoining prong portion 20 extends at right angles to the engaged surface of the stud. Consequently, on flattening of the generally bowed fastener body, the tongues 15 are moved inwardly toward each other, thereby directly forcing the prong portions 20 on the extremities of said tongues into embedded, anchored engagement with the body of the bolt or stud, as described. Preferably, the prong formation on a tongue extremity comprises a pair of such prongs, as shown, which cooperate in the manner shown in Fig. 3 in providing a balanced, equal biting engagement with the bolt or stud at spaced points to resist any lateral displacement which would tend to loosen the prongs from final applied fastening position in positive locked and embedded engagement with the bolt or stud, as aforesaid.

It has been found that this most effective locking and axial drawing action of a spring nut to provide a tightened and positive locked installation is best obtained when the generally concave base thereof is flattened without any substantial pressure on the tongues 15 themselves; any substantial pressure on the tongues prevents proper sliding engagement of the prongs 20 on the extremities thereof against the shank of the bolt or stud on being applied, and also bends the tongues with respect to the generally concave base such that said prongs 20 thereon are deformed out of position for most effective contact with the bolt or stud.

This application of the spring nut to fastening position is preferably effected by the use of a special tool comprising spaced jaws which may be fitted to the side portions 12 of the generally concave fastener base thereof without materially contacting the tongue elements 15. Thus, by a simple substantially axial thrust, pressure may be applied to the said side portions 12 to flatten the same and tension the generally concave base of the spring nut with the prongs 20 on the extremities thereof embedded in the bolt or stud in the manner described; and accordingly, when the tool is withdrawn and the attendant pressure removed from the flattened side portions 12, the tension stored in said side portions effects the axial drawing action on the shank of the bolt or stud to provide the aforesaid locked and tightened fastening installation under continuously effective spring tension.

Figs. 5 and 6 disclose another form of the invention in which the spring nut 30, or the like is provided in the manner of a disc-like washer comprising a generally bowed or concave base 31 and spaced tongues 15' arranged in radial relation to a central bolt opening therein. The tongues 15' may be provided in any selected number in various similar and equivalent fastener designs. Said tongues 15' have the same general prong construction provided by arcuate cutouts 16', or the like, on the extremities thereof as in the form of invention described with references to Figs. 1–4, inclusive, in which the spaced prongs 20' on a tongue extremity define spaced vertically extending pointed knife edges 21' adapted for anchored, embedded engagement with the bolt at spaced points.

As shown in Fig. 5, a disc-like spring nut of this character is advantageously used as a retainer for holding a structural bolt 8 in fastening position in readiness for application of the associated nut 9 to complete a fastening installation such as an assembly composed of superposed structural parts C, D, having aligned bolt passages. In a blind fastening installation, for example, in which the head of the bolt 8 carried by part C is not conveniently or readily accessible for holding the bolt in fastening position preparatory to the application of the nut 9, the spring fastener 30 serves to secure said bolt fixedly and rigidly in fastening position as necessary for the application of the nut to complete the fastening installation without need for holding the bolt as the nut is applied and rotated in threaded engagement therewith.

Even though such a bolt 8 is of a high-strength design for heavy duty purposes and therefore has a hard, tough surface, the improved spring fastener of the invention is admirably suited as a retainer therefor in that the prongs 20' on the tongue extremities are adapted to cut into and penetrate the hard surface of the bolt and otherwise become embedded in the body of the bolt in anchored relation therewith in the same general manner as described with reference to the form of invention of Figs. 1-4 inclusive. The bolt, accordingly, is effectively retained in its proper fastening position by the spring fastener 30 and is not subject to loosening, displacement or removal from such fastening position during handling of the part to which it is attached in assembling the same in an installation or, when it is necessary to disassemble and resecure the parts of an installation as for repair or service purposes.

The spring fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and capable of providing an effective and reliable fastening means.

While the invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claim intended to be embraced therein.

What is claimed is:

A thin, spring sheet metal fastening structure comprising a generally arched base provided with a stud receiving opening, cooperating tongues defined by spaced substantially parallel slits in said base extending from said stud receiving opening and providing said cooperating tongues with their free ends adjacent said stud receiving opening, said cooperating tongues being bent to project out of the plane of said base and each of said cooperating tongues having a cutout on its free end of less width than the width of the tongue and defining spaced prongs terminating in spaced pointed edges spaced apart a distance smaller than the diameter of the stud to be inserted in said stud receiving opening, said cutout otherwise being of such size that the edge of said cutout between said spaced pointed edges is spaced from said stud to be inserted in said stud receiving opening, the corner extremities of said cooperating tongues outwardly from said pointed edges being bent toward said base so that the entire pointed edge of each prong defines substantially a vertical knife edge extending substantially parallel to the vertical axis of said stud receiving opening and said complete knife edge is adapted for line contact, self-cutting action axially of the stud to cut into and embed in the stud upon tensioning of said generally arched base in applied fastening position.

RICHARD A. HARTMAN.

REFERENCES CITED

The following references are of record in the file of this patent:

UNITED STATES PATENTS

| Number | Name | Date |
|---|---|---|
| 295,960 | Van Dusen | Apr. 1, 1884 |
| 334,790 | McTighe | Jan. 26, 1886 |
| 1,276,882 | Davis | Aug. 27, 1918 |
| 1,675,277 | Roe | June 26, 1928 |
| 1,982,011 | Michel | Nov. 27, 1934 |
| 2,135,417 | Tinnerman | Nov. 1, 1938 |
| 2,230,916 | Tinnerman | Feb. 4, 1941 |
| 2,275,058 | Draving | Mar. 3, 1942 |
| 2,310,756 | Tinnerman | Feb. 9, 1943 |
| 2,321,157 | Rees | June 8, 1943 |